United States Patent [19]
Oja

[11] Patent Number: 5,509,208
[45] Date of Patent: Apr. 23, 1996

[54] WHEEL HOLE AND LUG MEASURING TOOL AND METHOD

[76] Inventor: Chris J. Oja, 131 W. 500 South, Ste. 608, Bountiful, Utah 84010

[21] Appl. No.: 171,056

[22] Filed: Dec. 20, 1993

[51] Int. Cl.$^6$ .................................................. G01B 5/14
[52] U.S. Cl. ................................................ 33/203; 33/810
[58] Field of Search ........................... 33/203, 600, 809, 33/810, 811

[56] References Cited

U.S. PATENT DOCUMENTS

| | | | |
|---|---|---|---|
| 897,437 | 9/1908 | Watson | 33/810 |
| 3,126,638 | 3/1964 | Wickert et al. | 33/811 |
| 4,607,436 | 8/1986 | Clay | 33/203 |
| 4,730,399 | 3/1988 | Campbell | 33/203 |
| 5,101,569 | 4/1992 | Watkins | 33/203 |
| 5,317,813 | 6/1994 | Reed | 33/809 |

FOREIGN PATENT DOCUMENTS 504120  4/1920  France .................................. 33/810

OTHER PUBLICATIONS

Photograph of a device from Wheel Gauge, Inc. of 2021 Sunnydale Boulevard, Clearfield, Florida 34625 (no date).
Photograph of a device available from the McGee Company of Denver, Colorado. (no date).

Primary Examiner—William A. Cuchlinski, Jr.
Assistant Examiner—G. Bradley Bennett
Attorney, Agent, or Firm—Foster & Foster; Lynn G. Foster; L. Grant Foster

[57] ABSTRACT

Tools and related methods are disclosed by which vehicle wheel hub holes, lug-receiving holes, and wheel-receiving lugs are readily and accurately measured and correlated with a suitable replacement part of either type. One tool comprises two spaced measuring stations separated by a connector the length of which is adjustable by interrelated length-variable telescopic members. Each measuring station has a projection and a female recess or receptacle for use with lug-receiving wheel holes and wheel lugs, respectively. The two member connector comprises four and five hole/lug scales or graduations by which the part to be replaced can be used to set the adjustable spacing between the measuring stations and with which the replacement part can be precisely located, substantially independent of the technical skill and/or training of the person using the tool.

21 Claims, 4 Drawing Sheets

WHEEL HOLE AND LUG MEASURING TOOL AND METHOD

FIELD OF THE INVENTION

The present invention relates generally to wheels for vehicles and more particularly to a wheel hole and lug measuring tool and method by which the dimensional nature of the hub hole, four and five hole wheels and four and five wheel-receiving lugs, carried by brake discs and brake drums, may be facilely and accurately measured without the requirement of substantial technical training.

BACKGROUND

In the past, it has been difficult, particularly for lay persons having limited technical training and technical competence, to provide specific hub hole, wheel hole, and/or wheel-receiving lug identification when seeking a replacement wheel and/or a replacement brake drum or brake disc. This has been largely true because the sizing and dimensions of hub holes, five and four hole wheels, originating with various manufacturers, are inherently incongruent, which is also true of five and four lug brake structure. Thus, heretofore, much trial and error have typically followed attempts, particularly at vehicle salvage yards and other sources of used vehicle parts, to locate a correctly sized and dimensioned replacement wheel and/or replacement brake drum or brake disc which will meet the needs of the customer.

While the prior art has attempted to address the problem mentioned above, no complete solution was found which solved the complete metes and bounds of the problem.

The aforesaid long-standing problem has persisted. A need, therefore, has existed for a simple tool by which any sized vehicle wheel and wheel lug structure could be readily and accurately identified by persons with little or no technical training.

BRIEF SUMMARY AND OBJECTS OF THE PRESENT INVENTION

In brief summary, the present invention overcomes or substantially alleviates the above-mentioned problems of the prior art. A tool and related methods are provided by which vehicle hub holes, wheel holes, and wheel-receiving lugs are readily and accurately measured and correlated with a suitable replacement part of either type. The tool comprises two spaced measuring stations separated by a connector the length of which is adjustable by interrelated length-variable members comprising the connector. Each measuring station has juxtaposed male and female measuring sites for use with wheel holes and wheel-receiving lugs, respectively. The male measuring site can accommodate measuring of both the hub hole and the array of lug-receiving holes of a given wheel. Preferably, the two member connector comprises four and five hole/lug scales or graduations, by which the vehicle part to be replaced can be used to set the adjustable spacing between the measuring stations and with which the replacement part can be precisely located substantially independent of the technical skill and/or technical training of the person using the tool. The scales can be based in any unit of measurement, such as inches, centimeters, or both. Once the desired setting for the two member connector is selected, a detent bias exists which holds the setting against inadvertent change.

With the foregoing in mind, it is a primary object of the present invention to provide a novel tool and related method which solve or substantially alleviate the problems of the prior art mentioned above.

Another significant object is the provision of a novel tool and related methods by which vehicle wheel hub holes, wheel lug-receiving holes, and/or wheel-receiving lugs are readily and accurately measured.

A further important object is the provision of a novel tool and related methods by which vehicle wheel hub holes, wheel lug-receiving holes, and/or wheel-receiving lugs are readily and accurately measured and correlated with a suitable replacement part of either type.

Another paramount object is the provision of a novel tool and related method, the tool comprising two spaced wheel hole/lug measuring stations connected by an adjustable connector.

An additional dominant object is the provision of a novel tool and related method comprising interconnected, spaced measuring stations each station comprising juxtaposed male and female measuring sites for use in measuring the size and dimensional nature of vehicle hub holes, wheel lug-receiving holes, and/or wheel-receiving lugs.

Another principal object is the provision of a novel adjustable tool and related method for measuring wheel hub holes, lug-receiving holes, and/or lugs comprising at least one scale by which a wheel or lug part to be replaced can be used to set the adjustment to precisely accommodate locating of a replacement wheel or lug part.

A further significant object is to provide a novel tool and related method for measuring wheel hub holes, lug-receiving holes, and/or lugs substantially independent of the technical skill and/or technical training of the user of the tool.

Another important object is to provide a novel tool and related method for measuring wheel hub holes, lug-receiving holes, and/or lugs, which tool is selectively settable wherein the setting resists inadvertent change.

An additional dominant object is the provision of a novel tool and method of the type mentioned above wherein detent or bias structure prevents rotation of movable portions of the tool, limits the extent to which relative rectilinear translation is permitted and/or holds the tool in a desired setting against inadvertent relative displacement of parts of the tool.

These and other objects and features of the present invention will be apparent from the detailed description taken with reference to the accompanying drawings.

DETAILED DESCRIPTION OF THE ILLUSTRATED EMBODIMENTS

Figure 1:
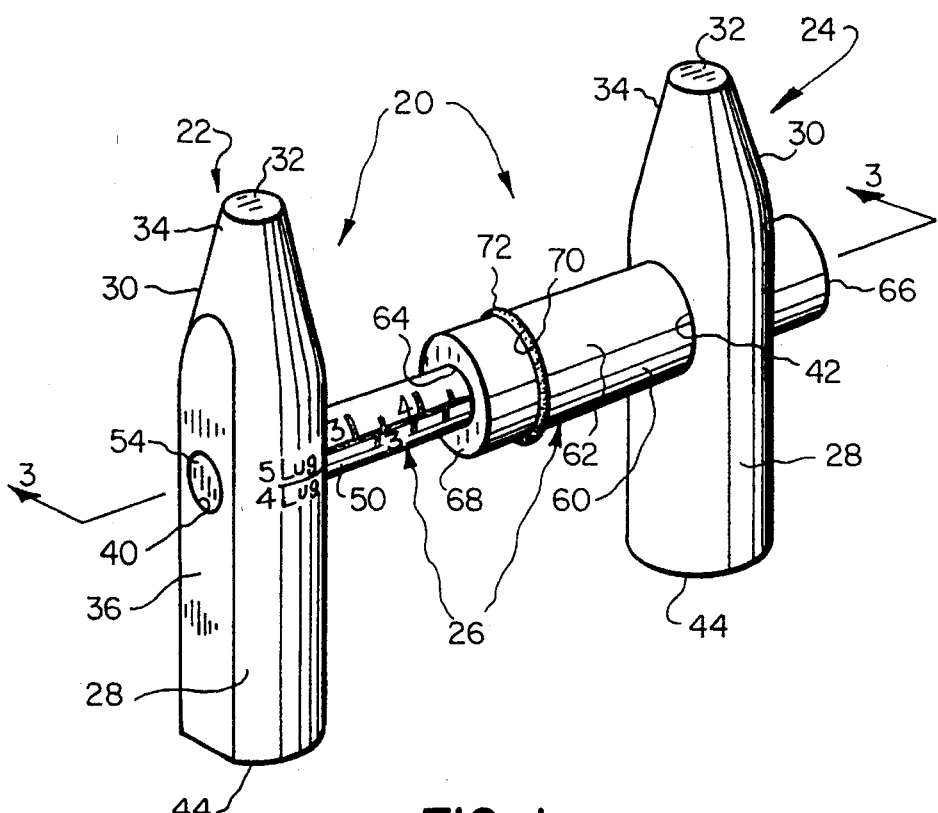
FIG. 1 is a perspective representation of one embodiment of a wheel and lug measuring tool embodying the principles of the present invention.

Reference is now made to the drawings wherein like numerals are used to designate like parts throughout. Specific reference is made to FIG. 1 which illustrates in perspective one embodiment fashioned in accordance with the principles of the present invention comprising a tool, generally designated 20, for measuring vehicle wheel lug-receiving holes and vehicle wheel-receiving lugs of a vehicle part to be replaced. The tool 20 accommodates facile and accurate location of a suitable replacement vehicle part.

The tool 20 comprises first and second measuring stations, sites or objects, respectively generally designated 22 and 24. The first and second measuring stations 22 and 24 are adjustably joined together by a connector, generally designated 26 by which the distance between wheel lug-receiving holes or wheel-receiving lugs is accurately measured. Each measuring station 22 and 24 comprises, as illustrated, a single body 28 of solid material, except as mentioned below.

The body 28 of each measuring station 22 and 24 may comprise any suitable material, such as wood, metal, including but not limited to aluminum and synthetic resinous materials, as will be apparent to those skilled in the art. The body 28 of solid material comprising each of the measuring stations 22 and 24 comprises a male portion or projection 30, illustrated as comprising a continuous taper ending in a blunt, transverse edge surface 32. The portion of each male projection 30 directly adjacent blunt edge surface 32 comprises a tip 34.

In the Figures, approximately one-third of the longitudinal dimension of each body 28 is occupied by the taper of the male projection 30.

While the exterior surface of the body 28 of the measuring station 22 is illustrated as comprising a flat area or surface 36, it is to be appreciated that the flat area 36 is not critical. The body 28 of either measuring station 22 and 24 could comprise any desired shape, including the generally cylindrical shapes illustrated in the Figures.

Figure 3:
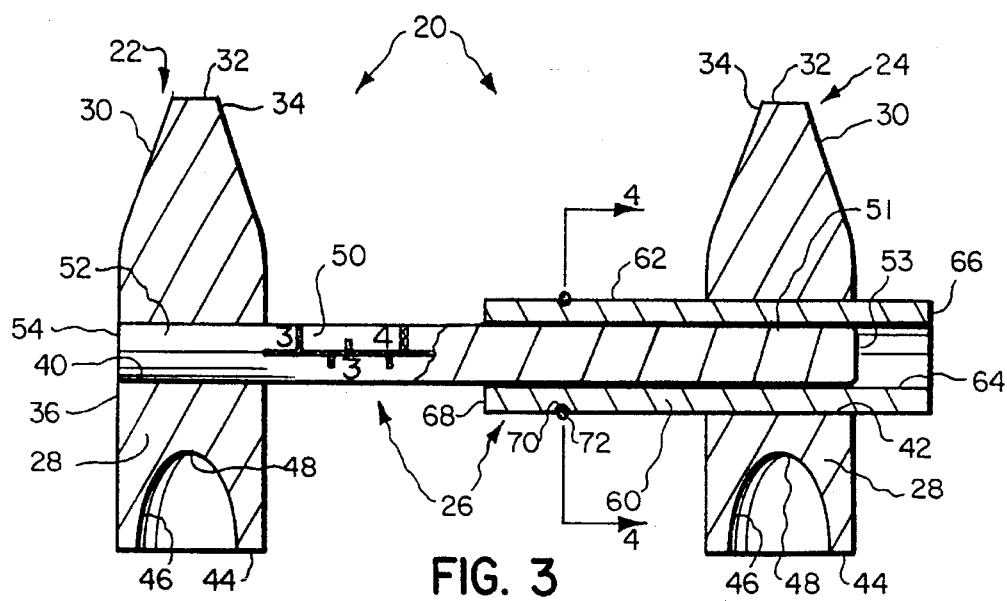
FIG. 3 is a cross-section taken along lines 3—3 of FIG. 1.

Measuring station 28, at approximately the midpoint of the length thereof comprises a throughbore 40 of a predetermined uniform diameter, as illustrated, particularly in FIG. 3. The measuring station 24 similarly, at essentially its midpoint, comprises a transversely directed throughbore 42, the uniform diameter of which is somewhat larger than the uniform diameter of bore 40. The purposes of bores 40 and 42 will be explained hereinafter.

The body 28 of each measuring station 22 and 24 comprises a flat, transverse base 44 into which a self-centering, lug-receiving, symmetrical blind bore or cavity receptacle 46 has been formed. The surface of each blind bore 46 is tapered so that when the bore 46 of either station is placed over a wheel-receiving lug, as explained hereinafter in greater detail, the lug will center itself so as to be positioned in every case contiguous and aligned with the apex 48 of the associated blind bore 46.

The base surface 44 is illustrated as being disposed transverse of the longitudinal axis of the measuring station of which it forms a part, which is true also of blunt surface 32.

The adjustable connector 26 comprises a first connector member 50, which is illustrated as being solid and cylindrical in its configuration, the cylinder having a uniform diameter through the entire length thereof. Connector member 50 comprises an outside diameter substantially the same as the diameter of bore 40 into which one end 52 of the connector member 50 is placed. A press fit union may be used. Alternatively or cumulatively, a suitable adhesive or bonding agent may be interposed between the end 52 of the connector member 50 and the bore 40, in a manner well understood by those skilled in the art. End 52 is illustrated as terminating in a blunt edge 54 shown as being flush with flat surface 36 of the measuring station 22.

The adjustable connector 26 further comprises second member, i.e., a hollow tubular connector member 60, which telescopically receives end 51 of member 50. Member 60 is illustrated as having an exterior cylindrical surface 62, the diameter of which is substantially identical to the diameter of the bore 42 in which the connector member 60 is inserted. A force fit union may be used, as may be gluing or bonding. Connector member 60 is illustrated as projecting both left and right of the measuring station 24, as shown in FIG. 3, to better accommodate varying the distance between the measuring stations 22 and 24 caused by selective telescopic movement of member 50 to and fro along the interior bore 64 of member 60 to accommodate measurement of any wheel size and any wheel-receiving lug size. As mentioned the connector member 60 comprises an interior longitudinally-directed bore 64, the diameter of which is only slightly greater than the diameter of the connector member 50 so that the two may be slidably displaced, one relative to the other, with the connector member 60 functioning as a guide to preserve axial alignment between the two connector members 50 and 60.

As illustrated, the connector member 60 comprises blunt distal edge 66 at one end thereof and blunt edge 68 at the maximal end thereof, each essentially parallel, although offset from the axis of the measuring stations 22 and 24 and, therefore, transverse to the common longitudinal axis of the connector members 50 and 60.

The second end 51 of the connector member 50 thus moves back and forth within the hollow bore 64 of the connector member 60. The second end 51 of the connector member 50 terminates in a blunt edge 53 which is disposed parallel to, but offset from the longitudinal axis of the measuring station 24 and, therefore, transverse to the common longitudinal axis of the connector members 50 and 60.

Figure 4:
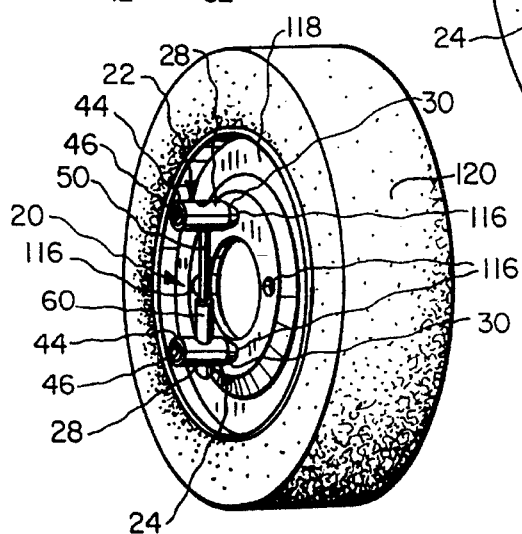
FIG. 4 is a cross-section taken along lines 4—4 of FIG. 3.

The external cylindrical surface 62 is interrupted by an annular rounded groove 70 into which is placed an undersized O-ring 72. O-ring 72 forms a part of the biasing/detent mechanism, generally designated 80 and best illustrated in FIG. 4.

Figure 2:
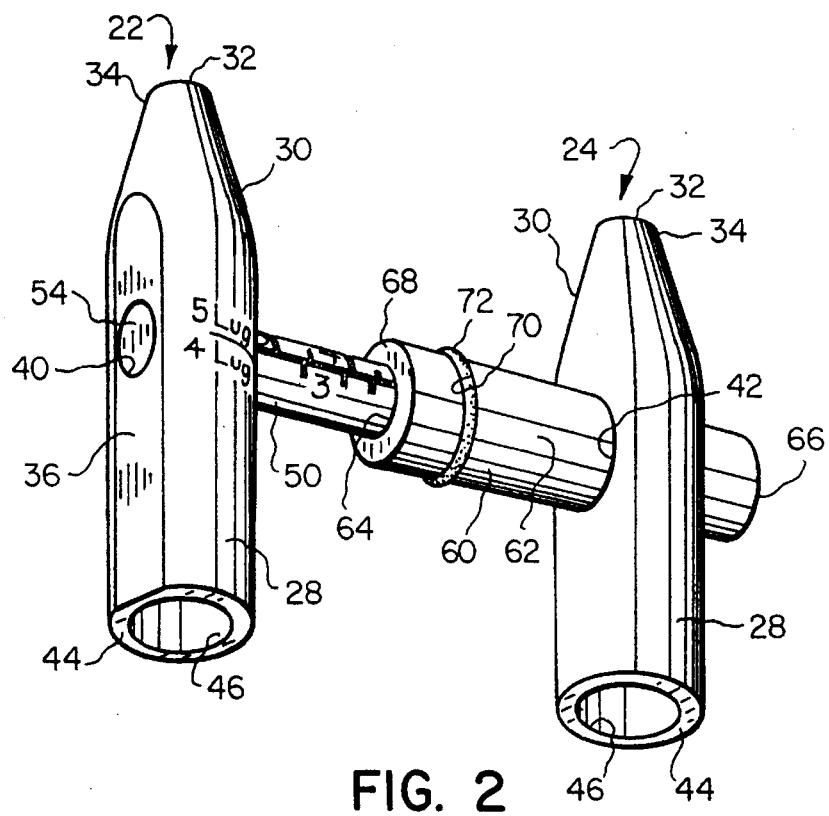
FIG. 2 is a second perspective view of the wheel and lug measuring tool illustrated in FIG. 1.

As can be seen in any of FIGS. 1 through 3, telescopic displacement of one of the connector members 50 and 60 in respect to the other to diagonally measure distances lug-receiving between wheel holes and/or wheel-receiving lugs, sets the tool 20 at a space or specific distance between the longitudinal axis of the two measuring stations 22 and 24 which equals precisely the distance between the distance between two spaced lug-receiving wheel holes or two spaced lugs. By reading the five lug scale or graduations located on the exterior of member 50, in situations where the wheel comprises an array of five holes or an array of five lugs, one can immediately know the exact diameter of the array of five holes or five lugs. In this way the requisite information necessary is obtained to find a replacement wheel having the same five hole array or a replacement vehicle part, such as a brake disc or brake drum, comprising the same five lug array.

In four lug or four lug-receiving wheel hole arrays, measuring diagonally directly across the diameter of the lug locations or lug-receiving wheel hole locations, in the manner described above, will produce a direct diametral reading at the four lug scale found on the exterior surface of the connector member 50. It should further be appreciated that measurements between lugs or lug-receiving wheel holes are always made diagonally so that there is at least one lug or lug-receiving wheel hole between the two sites being measured, as will become more apparent from the description which follows.

The cylindrical connector member 50 comprises a longitudinally-directed external slot 82 (FIG. 4), which extends along one side from a location at or near the distal end 51 thereof a distance along the connector member 50 only slightly in excess of the distance which the members 50 and 60 are permitted to reciprocate telescopically in respect to each other. The slot 82, in the illustrated configuration (FIG. 4), is rounded or arcuate in its surface configuration so as to match the surface of a ball or sphere 84 of the detent mechanism 80. Thus, compression spring 86 forcibly urges the sphere 84 into contiguous relation with the linear slot 82, spring 86 being located in transverse bore 88 disposed in the connector member 60. The spring 86, at one end thereof, engages and forcibly urges sphere 84 against the groove 82 and, at the other end thereof, abuts against O-ring 72, which is compressingly disposed within exterior annular slot 70.

Detent mechanism 80, accordingly, limits the relative movement permitted between connector members 50 and 60 to rectilinear reciprocable translation. In other words, connector member 50 is not permitted to rotate relative to connector member 60, and vice versa. Furthermore, the engagement of the sphere 84 with the groove 82 causes the above-mentioned rectilinear translation to be limited to the length of the groove 82 due to engagement between the sphere 84 and the end of the groove 82. In addition, the forced relationship between sphere 84 and groove 82 holds the members 50 and 60 in a selected relationship created by measuring, in the manner mentioned above, the distance between diagonally disposed wheel holes or wheel-receiving lugs, against inadvertent relative displacement.

In this way, the tool 20 may be used directly to correspondingly measure a prospective replacement wheel or prospective replacement lug-carrying brake disc or brake drum. In the alternative, the appropriate one of the two exposed scales or graduations carried along the exterior surface of the connector member 50 may be read by the user and that information, without further physical use of the tool 20, may be used to locate the desired vehicle replacement part.

Figure 9:
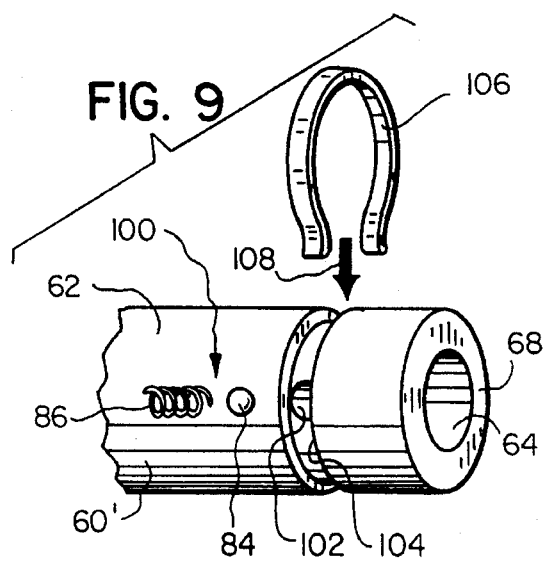
FIG. 9 is an enlarged fragmentary perspective illustrating a second tool embodiment of the present invention.
Figure 10:
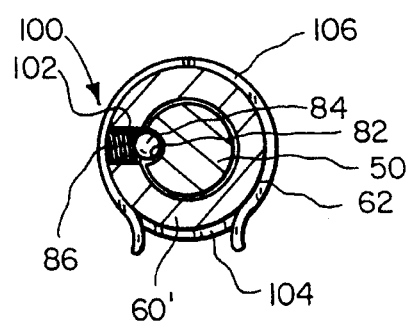
FIG. 10 is a cross-section of alignment-retaining guidance structure forming a part of the second embodiment illustrated in FIG. 9.

Reference is now made to FIGS. 9 and 10 which illustrate a second detent embodiment, generally designated 100. More specifically, FIG. 9 illustrates a connector member 60', identical in all respects to connector member 60, except as hereafter explained. Connector member 60' may be used in lieu of connector member 60 to form a part of the previously described connector 26 of the tool 20. It is to be appreciated that the orientation of connector member 60' in FIG. 9 is the reverse of the orientation of member 60, as illustrated in FIGS. 1 through 3. A side bore 102 is disposed near the edge 64 and in alignment with the previously described groove 82 disposed along the exterior surface of the member 50. Side bore 102 is substantially identical to previously described side bore 88. Side bore 102 is disposed transverse of the longitudinal axis of the member 60' and extends from the interior axial bore 64 to an annular radially disposed groove 104 located at the exterior surface 62 of the member 60'. Annular groove 104 is illustrated as being essentially rectangular in cross-sectional configuration.

The previously described sphere 84 and spring 86 of detent 100 are placed seriatim in the bore 102 to serve the same purposes previously described in connection with the detent mechanism 80. Thus, the interior end of the spring 86 contiguously urges the sphere 84 into forced, contiguous relation with the slot 82. The outside end of the spring 86 abuts against a horseshoe-shaped snap ring 106, the unstressed diameter of which is slightly less than the diameter at the base of the groove 104. Thus, when the ends of the horseshoe-shaped snap ring 106 are forced downwardly, as illustrated by arrow 108 in FIG. 9, the ends separate, the diameter of the snap ring 106 is enlarged, and when the ends pass the zenith point of the groove 104, they move due to memory toward each other but remain separated by a distance greater than the unstressed distance between them due to contact with the base of the groove 104. Accordingly, the snap ring 106 is under a moderate compression load when fully inserted into groove 104 such that the sphere 84 and the spring 86 are firmly held in the positions shown in FIG. 10.

Figure 5:
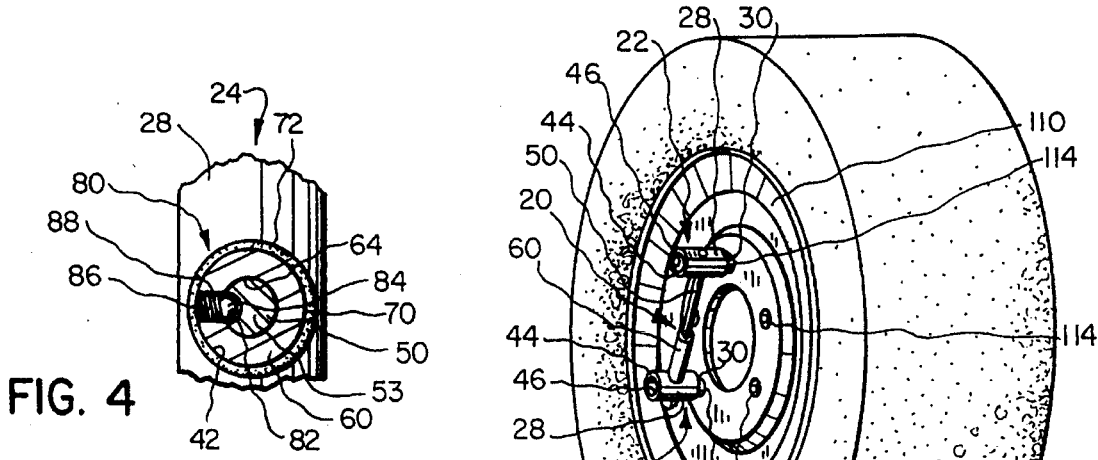
FIG. 5 illustrates in perspective use of the tool of FIG. 1 to measure a five lug wheel.

Reference is now made to FIG. 5 which illustrates the manner in which the tool 20 is utilized to measure a five lug-receiving hole wheel 110 (having a tire 112 illustrated as being mounted thereon). Wheel 110 comprises a centrally located hub hole 113.

The measurement taken on a five-hole wheel must be a diagonal measurement, i.e., in reference to FIG. 5, such that at least one lug-receiving wheel hole 114 must be disposed on each side of the two lug-receiving wheel holes 114 diagonally being measured. The measurement taken in the diagonal mode illustrated in FIG. 5 for a five-hole wheel is not a measurement of the diameter of the array of lug-receiving wheel holes 114, but rather a trigonometric function thereof. Accordingly, the creation of the five lug scale illustrated as the top scale on connector member 50 in FIG. 1 provides information by which the actual diameter of the array of holes 114 may be directly read, the top five lug scale being trigonometrically derived based upon right angle considerations where the distance being measured as illustrated in FIG. 5 constitutes not the hypotenuse of a right triangle, but one of the other two components thereof.

Figure 6:
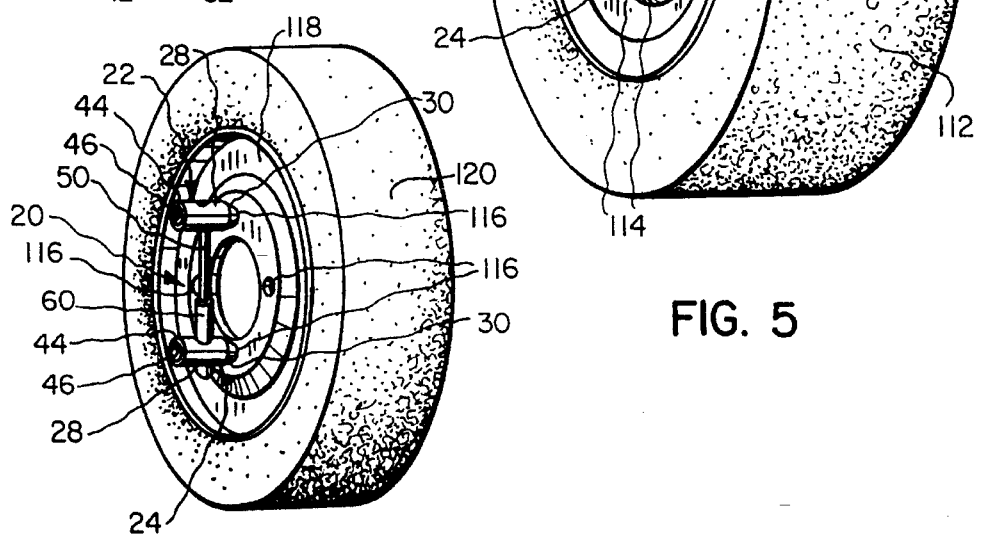
FIG. 6 is a perspective illustrating use of the tool of FIG. 1 to measure a four lug wheel.

To the contrary, as illustrated in FIG. 6, the requisite diagonal measurement between opposed holes 116 disposed in a wheel 118 having a tire 120 mounted thereon produces a direct measurement of the diameter of the array of lug-receiving holes 116. Wheel 118 comprises a centrally located hub hole 119. This direct reading of the diameter of the array may be read directly from the lower or four lug scale or graduations carried at the exterior of the male connector 50, as best illustrated in FIGS. 1 and 2. Again, for a proper diagonal reading to be taken using the tool 20 in conjunction with a four hole wheel requires that one nonmeasured hole 116 be located on each side of the tool 20 as it is caused to span between the two other holes with the male projections 30 respectively inserted within and centered upon the two holes being measured, as illustrated in FIG. 6.

Figure 7:
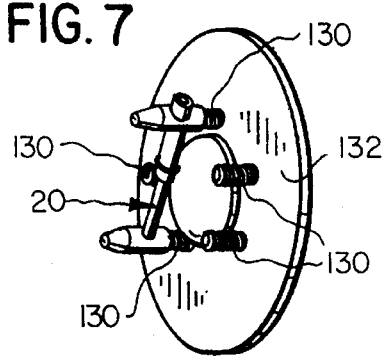
FIG. 7 is a perspective illustrating use of the tool of FIG. 1 to measure a five lug brake drum.
Figure 8:
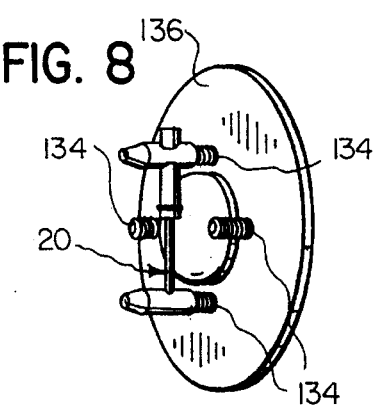
FIG. 8 is a perspective representation illustrating use of the tool of FIG. 1 to measure a four lug brake drum.

The same rational described above for a five hole wheel and a four hole wheel applies to taking measurements of wheel-receiving lugs of the five lug array and four lug array types, respectively illustrated in FIGS. 7 and 8. While the five lugs 130 are illustrated in FIG. 7 as being mounted to a brake disc 132 and the four lugs 134 are illustrated as being mounted to a brake disc 136 in FIG. 8, each in a conventional fashion, the lugs of the five lug array and four lug array so illustrated are intended to be representative and not restrictive. Accordingly, the five lug array could be presented on a brake drum, for example, which is also true of the four lug array.

With reference to FIG. 7, the tool 20 is positioned such that the blind bores 46 of the two measuring stations 22 and 24 are respectively placed over and centered upon two diagonally-located lugs such that at least one lug 130 is disposed on each side of the two lugs being measured. While the measurement is not of the diameter of the array of lugs, it is one non-hypotenuse leg of a right triangle and, therefore, constitutes a trigonometric function of the actual diameter of the five lug array. That trigonometric function is converted by the five lug scale on member 50 to an actual diameter, which information may be read directly from the four lug scale on member 50 by the user and utilized in locating a replacement vehicle part having the same size and dimensional characteristics of the vehicle part 132 being replaced.

To the contrary, utilization of the tool 20, in the manner described above, to measure diagonally between two lugs 134 of a four lug array (wherein one unmeasured lug is disposed on each side of the tool 20) yields directly the diameter of the array of lugs 134, which diameter may be read directly from the four lug scale carried in an exposed location on the exterior of connector member 50. Edge 68 of connector member 60 is disposed within a plane intersecting the five lug and four lug scales and constitutes the point at which each scale is to be read once the distance between the two measuring stations 22 and 24 has been established in the manner illustrated and described in conjunction with FIGS. 5 through 8.

Figure 11:
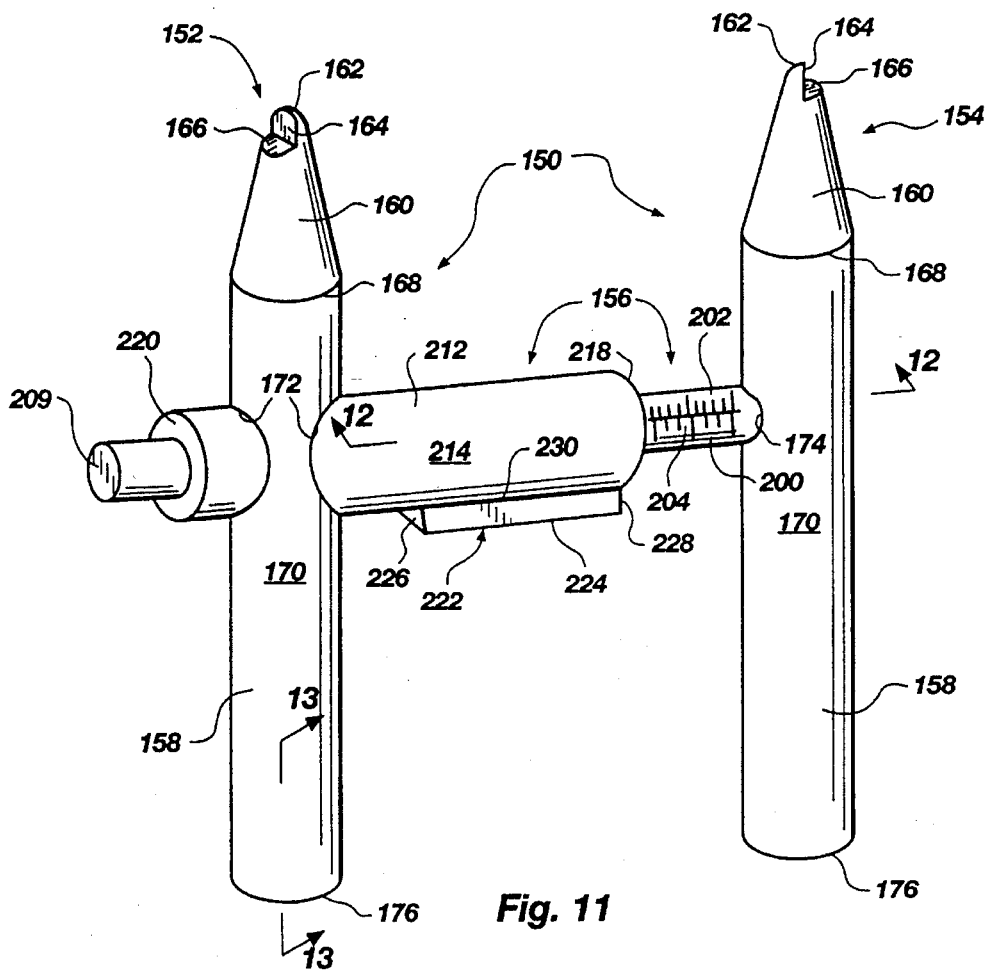
FIG. 11 is a perspective representation of a second embodiment of a wheel and lug measuring tool embodying the principles of the present invention.
Figure 12:
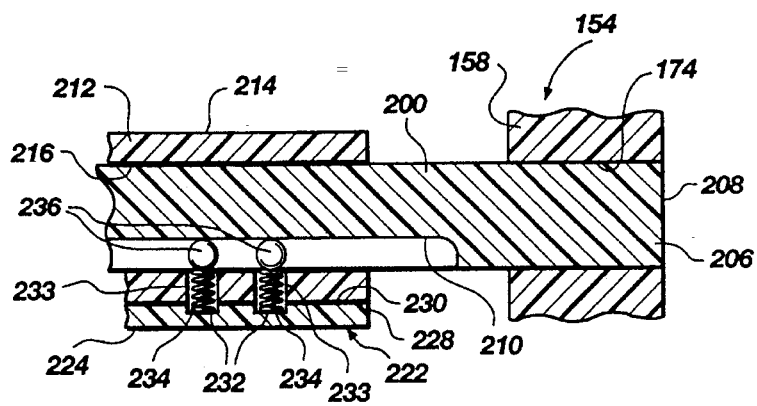
FIG. 12 is an enlarged fragmentary cross-section taken along lines 12—12 of FIG. 11.
Figure 13:
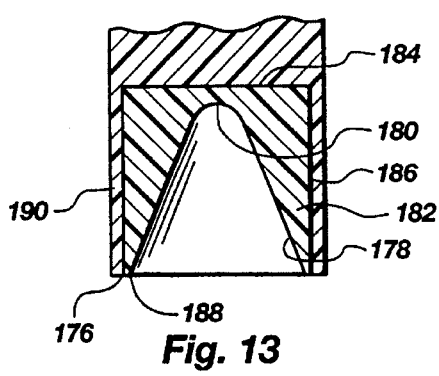
FIG. 13 is an enlarged fragmentary cross-section taken along lines 13—13 of FIG. 11.

Specific reference is now made to FIGS. 11 through 13, which illustrate a second embodiment fashioned in accordance with the principles of the present invention comprising a tool, generally designated 150, for measuring vehicle wheel hub holes, wheel lug-receiving holes, and wheel-receiving lugs. The tool 150 accommodates facile and accurate location of a suitable replacement or supplemental vehicle wheel.

The tool 150 comprises first and second measuring stations, sites or objects, respectively generally designated 152 and 154. The first and second measuring stations 152 and 154 are adjustably joined together by a connector, generally designated 156, by which the diameter of the wheel hub hole, the distance between wheel lug-receiving holes and/or the distance between wheel-receiving lugs are accurately measured. Each measuring station 152 and 154 is illustrated as being comprised of solid material formed from a suitable synthetic resinous material, for example, by injection molding using conventional techniques. Each measuring station 152 and 154 comprises a body 158 comprising solid material, except as mentioned below. The body 158 of each measuring station 152 and 154 may comprise materials other than synthetic resinous material, as will be apparent to those skilled in the art.

The body 158 of solid material comprising each of the measuring stations 152 and 154 comprises a tapered male portion or projection 160 at one end thereof wherein the taper is continuous terminating in a notched tip 162. The notched tips 162 of the first and second measuring stations are illustrated as being identical, though of opposite hand. Each notched tip 162 comprises a vertically-directed face 164, which is illustrated as being planar, but which could be slightly rounded so as to match or substantially match a wheel hub hole to be measured, as explained hereinafter, using the two oppositely directed notched tips 162. FIGS. 5 and 6 illustrate hub holes 113 and 119, respectively, with which notched tips 162 may be used.

As is shown in FIG. 11, the tapered projection 160 of each measuring station 152 and 154 occupies slightly less than one quarter of the total longitudinal dimension of associated body 158. Each tapered projection 160 merges at corner 168 with an exterior cylindrical surface 170 of the body 158. While the exterior 170 of each body 158 is illustrated as being cylindrical, it is to be appreciated that other suitable exterior configurations could be used without departing from the principles of the present invention.

Measuring station 152, below the corner 168, comprises a throughbore 172 having a predetermined uniform diameter, which is relatively large. The measuring station 154 similarly comprises a transversely directed through bore 174 of a smaller uniform diameter. The purposes of the bores 172 and 174 will be explained hereinafter, but bore 172 is disposed in alignment with bore 174 when the tool 150 is fully assembled.

The body 158 of each measuring station 152 and 154 comprises a transverse base 176 in the form of a ring, each base merging with a tapered blind bore 178 (FIG. 13). Each blind bore 178 comprises a self-centering, lug-receiving, tapered symmetrical blind bore or cavity. The surface of each blind bore 178 is tapered so that when the bore 178 of either station is placed over a wheel-receiving lug, as explained above, the lug will center itself so as to be positioned each time contiguous and aligned with the apex 180 of the associated blind bore 178.

The blind bore 178 is illustrated as comprising part of a cylindrical insert 182, which is formed of a suitable synthetic resinous material and comprises a planar top surface 184, an annular surface 186, and a narrow base surface 188. Preferably surfaces 184, 186 are bonded to a surface 185 and an annular wall 190, respectively, forming the lower end of each measuring station 152 and 154.

The adjustable connector 156 comprises a first connector member 200, which is illustrated as being solid and cylindrical in its configuration, resembling a dowel. First connector member 200 is illustrated as having a uniform diameter throughout the entire length thereof and comprises two exposed scales 202 and 204, one in inch measuring units and one in centimeter measuring units for determining the size of a wheel hub hole, the size of an array of lug-receiving wheel holes and the size of an array of lugs adapted to be positioned through holes in a vehicle wheel.

Connector 200 comprises an outside diameter substantially the same as the diameter of the bore 174, into which one end 206 of the connector member 200 is placed. A press-fit union may be used. Alternatively or cumulatively, a suitable adhesive or bonding agent or welding may be used between the connector member 200 and the wall of the bore 174, in a manner well known to those skilled in the art. Thus the end 206 (FIG. 12) is securely disposed within the bore 174. End 206 terminates in a blunt exposed surface 208. The first connector member 200 terminates at the opposite end 211 in a blunt surface 209.

First connector member 200 further comprises an exposed bottom notch or groove 210, which provides alignment and detent functions as explained hereinafter in greater detail.

The adjustable connector 156 further comprises a second connector member 212, which comprises a sleeve having a cylindrical exterior surface 214 and an interior bore 216 of uniform diameter, the diameter being substantially the same as the diameter of first connector member 200 so as to accommodate rectilinear translation of the member 200 to and fro along the bore 216 to accommodate the measurements mentioned above. The exterior diameter of surface 214 is substantially identical to the diameter of the bore 172, into which the connector member 212 is inserted. A force-fit union may be used, as may be gluing, bonding, or plastic welding. Connector member 212 is illustrated as projecting both left and right of the first measuring station 152, as shown in FIG. 11, to better accommodate telescopically varying the distance between the measuring stations 152 and 154, while maintaining axial alignment between the members 200 and 212. Thus, the sleeve connector member 212 serves as a guide to maintain alignment during reciprocation of the connector member 200 to and fro along the bore 216. The connector member 212 terminates in blunt edges 218 and 220, respectively.

Supported along the lower portion of the cylindrical surface 214 of connector member 212 is a detent holder, generally designated 222. Holder 222 is illustrated as comprising essentially a solid block of synthetic resinous material comprising a planar exposed bottom surface 224, planar exposed end surfaces 226 and 228, and a concealed top surface 230, the diameter of which is the same as the diameter of the exterior cylindrical surface 214 of the connector member 212. Surface 230 is bonded, glued, or welded to surface 214.

Top arcuate surface 230 comprises two spaced blind bores 232. Blind bores 232 respectively are aligned with and have the same diameter as bores 233 disposed in connector member 212.

A compression spring 234 is disposed in each set of aligned bores 232 and 233, each abutting the associated base of the blind bore 232. The other end of each of the springs 234 abuts a detent and alignment retaining sphere 236, which is carried within and urged by the associated spring 234 against the groove 210. Accordingly, reciprocation of member 200 in respect to member 212 is limited to rectilinear translation and relative rotation is prohibited. Furthermore, the force exerted by the springs 234 against the spheres 236 is sufficient that once a relative position is manually established for first and second measuring stations 152 and 154, that position will be maintained against inadvertent relative displacement of members 200 and 212.

A relative telescopic displacement, without rotation in a rectilinear fashion of connector member 200 in respect to connector member 212 accommodates measurement of the diameter of the hub hole (113 and 119) of a wheel to be replaced, as explained above. That diameter may be read directly from either or both of the scales 202 and 204 in alignment with blunt edge 218.

Similar relative displacement of the measuring stations 152 and 154 accompanied by placement of the tapered projections 160 in diagonally disposed lug-receiving wheel holes provides a reference by which a replacement or supplemental wheel can be found, as explained above. Likewise, placement of the tapered blind bore 178 of each measuring station 152 and 154 over diagonally disposed wheel lugs provides for measurement of brake drum and brake disc parts desired to be replaced, for accurate identification of the same, as explained above. The foregoing is true independent of whether the lug-receiving wheel holes and/or wheel hole-receiving lugs are disposed in a four or a five set array, as explained previously.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A tool for vehicle wheel hole and lug measurement comprising:
    first and second hole/lug measuring stations;
    an adjustable connector spanning between and attached to the stations;
    each station comprising a male projection and a female receptacle, the male projection and the female receptacle at each station oriented in opposite directions relative to one another, the two male projections being adapted for selective placement in spaced vehicle wheel hole, and the two female receptacles being adapted for selective placement over spaced vehicle wheel lugs.

2. A tool according to claim 1 wherein the male projection and the female receptacle of each measuring station are directly aligned with each other and generally perpendicular to the adjustable connector.

3. A tool according to claim 1 wherein the male projection and the female receptacle of each measuring station are formed as one piece with the one piece comprising the female receptacle at a base thereof and the male projection at an opposed tip thereof.

4. A tool according to claim 1 wherein the adjustable connector comprises first and second telescopically-interrelated members.

5. A tool according to claim 4 further comprising bias retaining structure by which a setting of the adjustable connector is retained against inadvertent displacement.

6. A tool according to claim 5 wherein the bias retaining structure comprises a spring-biased sphere.

7. A tool according to claim 4 further comprising alignment-maintaining structure by which relative rotation of the first and second telescopically-interrelated members is prevented.

8. A tool according to claim 6 wherein the alignment-maintaining structure comprises a spring-biased sphere disposed in a side slot disposed in at least one of the first and second telescopically-interrelated members.

9. A tool according to claim 8 wherein the spring and sphere are retained in position by a retainer.

10. A tool according to claim 9 wherein the retainer comprises an O-ring.

11. A tool according to claim 9 wherein the retainer comprises a clip.

12. A tool according to claim 1 further comprising at least one scale carried by the adjustable connector.

13. A tool according to claim 1 wherein the adjustable connector is attached to at least one station by placement of an end of the connector into a bore in the station.

14. A tool according to claim 1 where each measuring station comprises a contour tip for contiguously engaging a hub hole of the vehicle wheel to measure the diameter of the hub hole.

15. A tool for vehicle wheel hole and lug measurement comprising:

spaced wheel and lug measuring objects;

connecting structuring comprising slidably interrelated members by which distance between the spaced measuring object can be manually varied;

concentrically aligned male and female ends formed at opposite ends of the spaced wheel and lug measuring objects;

a tour hole/lug scale carried by the connecting structure;

a five hole/lug scale carried by the connecting structure.

16. A tool for vehicle wheel hole and lug measurement comprising:

spaced wheel hole and lug measuring stations;

a connector spanning between and joined to the measuring stations comprising relatively displaceable interrelated components;

detent structure interposed between the interrelated components to hold the components in a predetermined set collective position against inadvertent change, the detent structure comprising a channel and two spaced projections biased into engagement with the channel, the spaced projections providing longitudinal relative stability to the interrelated components.

17. A tool for vehicle wheel hole and lug measurement comprising:

spaced wheel hole and lug measuring stations;

a connector spanning between and joined to the measuring stations comprising slidably interrelated components;

a position and alignment maintaining structure interposed between the slidably interrelated components to prevent relative movement or rotation of the interrelated components.

18. A method of measuring the size of vehicle wheel lugs of a vehicle part to be replaced and using the measurement to locate a replacement part comprising the steps of:

placing a female part of a first measuring station of a tool over a first wheel lug of the part to be replaced;

placing a female part of a second measuring station of a tool, adjustably interconnected to the first measuring station, over a second wheel lug of the part to be replaced;

acquiring information from the tool based upon the distance between the placed positions of the first and second measuring stations;

removing the stations from the lugs while an alignment and position maintaining structure automatically holds the setting of the interconnection between the lug-engaging first and second measuring stations and using the tool so held to physically measure and select the replacement part.

19. A method according to claim 19 wherein the acquiring step comprises reading a scale carried by the adjustable interconnection between the first and second measuring stations, the distance between the stations being a function of the diameter of the lugs.

20. A method of measuring the size of vehicle wheel holes of a vehicle part to be replaced and using the measurement to locate a replacement part comprising the steps of:

placing a male part of a first measuring station of a tool into a first lug-receiving wheel hole of the part to be replaced;

placing a male part of a second measuring station, adjustably interconnected to the first measuring station into a second lug receiving wheel hole of the part to be replaced;

acquiring information from the tool based upon the distance between the placed positions of the first and second measuring stations;

removing the male parts from the wheel holes while an alignment and position maintaining structure automatically holds the setting of the interconnection between the first and second measuring stations, and using the tool so held to physically measure and select the replacement part.

21. A method according to claim 20 wherein the acquiring step comprises reading a scale carried by the adjustable interconnection between the first and second measuring stations, the distance between the stations being a function of the diameter of the lugs.

* * * * *